Nov. 3, 1953  P. M. R. BARRET  2,658,169
PRODUCTION OF AEROSOLS
Filed March 14, 1949  3 Sheets-Sheet 1

Inventor:
Pierre Marie René Barret,
By his attorneys,
Baldwin, Wight, & Prevost

Nov. 3, 1953
P. M. R. BARRET
2,658,169
PRODUCTION OF AEROSOLS
Filed March 14, 1949
3 Sheets-Sheet 2
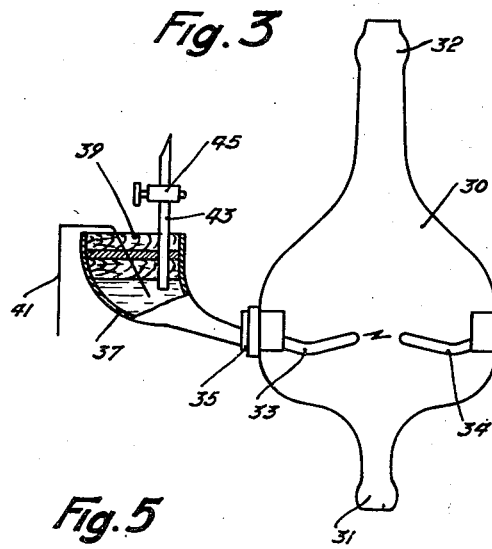
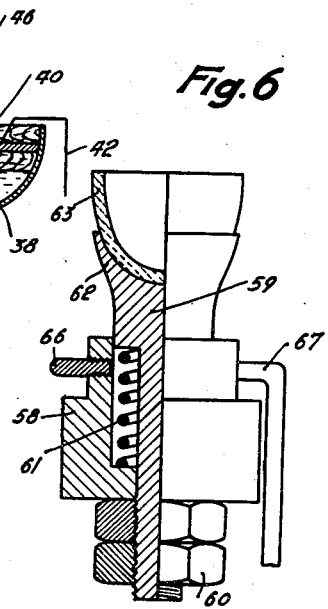
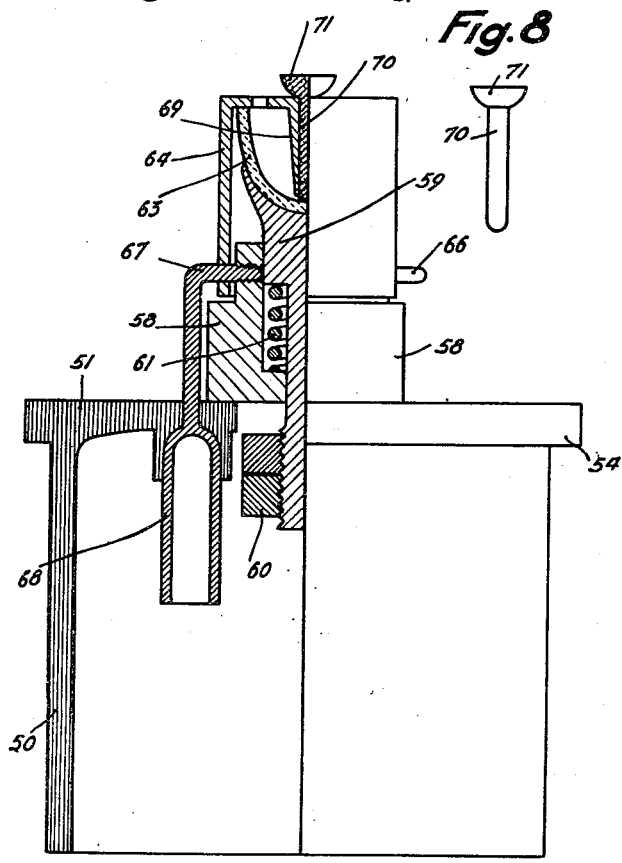
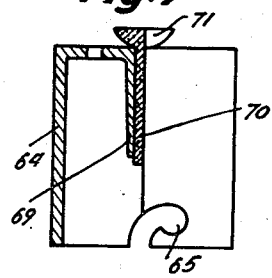
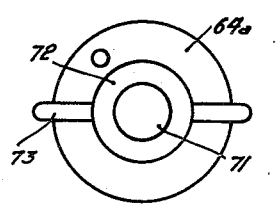
Inventor:
Pierre Marie René Barret,
By his attorneys,
Baldwin, Wight, + Prevost Nov. 3, 1953 P. M. R. BARRET 2,658,169
PRODUCTION OF AEROSOLS
Filed March 14, 1949 3 Sheets-Sheet 3

Fig. 4

Inventor:
Pierre Marie René Barret;
By his attorneys,
Baldwin, Wight, + Brevost

Patented Nov. 3, 1953

2,658,169

UNITED STATES PATENT OFFICE 2,658,169

PRODUCTION OF AEROSOLS

Pierre Marie René Barret, Marseille, France, assignor to Centre National de la Recherche Scientifique, Paris, France, a corporation of France Application March 14, 1949, Serial No. 81,287

Claims priority, application France March 18, 1948

7 Claims. (Cl. 317—3)

This invention relates to the production of aerosols of liquids, solutions, sols or liquid suspensions of substances capable of being used for biological or medical treatments.

One object of the invention is to provide a method whereby true aerosols may be obtained, which are formed of extremely fine particles, behave exactly like a gas and may thus penetrate deeply in the lungs, sinus and other cavities in living bodies.

Another object is to provide simple means for obtaining such aerosols, with the best yields and in the most economic manner.

Still another object is to provide an easily handled and portable device for producing such aerosols.

According to my invention, I produce an aerosol of a liquid by causing high voltage sparks to jump between two electrodes at least one of which is formed by the liquid of which it is desired to obtain the aerosol.

Different embodiments of apparatus for carrying out my invention are described in the specification hereinafter, following having reference to the appended drawings in which:

Fig. 3 is an elevational view of another type of aerosol producing apparatus with parts broken away and shown in section;

Fig. 4 is similar view of still another type of complete device for producing aerosols; and Figs. 5, 6, 7, 8 and 9 are elevational views of details of the form of my invention shown in Fig. 4, with parts shown in section.

Figures 1, 2:
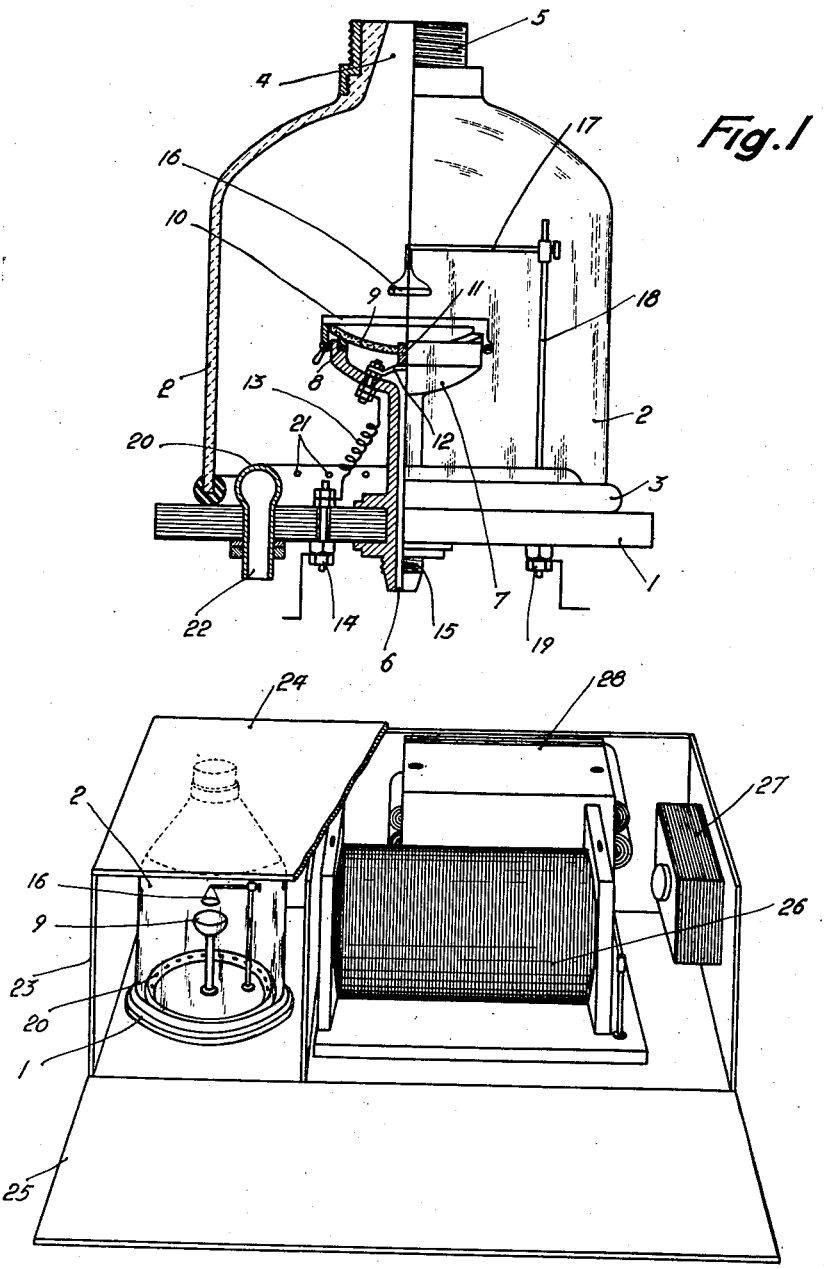
Fig. 1 is a part sectional, part elevational view of the aerosol producing part of such an apparatus.
Fig. 2 is a perspective view of a complete, portable device for producing aerosols.

As shown in Fig. 1 the aerosol producing apparatus comprises an insulating base plate 1 on which rests a transparent bell-jar 2, for instance made of glass, the rim of which is provided with a rubber bead 3 providing an air tight joint with the base plate 1. The bell-jar 2 terminates at its upper part with an outlet opening 4 provided with a threaded metal sleeve 5 for connection to the end of a flexible tube leading to an inhalator or a breathing mask (not shown).

In the base plate 1 is secured an upwardly extending tube 6 terminating in a cup 7 provided with a rubber ring 8 on which rests a cupel 9 made of porous porcelain, said cupel being pressed against ring 8 by a clamping ring 10 and being provided with a central contact rod 11 which presses against a resilient blade 12 secured in an insulated manner to cup 7 and connected by means of a wire 13 to a terminal 14 extending underneath the base plate 1. Tube 6 is provided, in its lower part underneath the base plate 1, with screw threads 15 adapted for the connection of said tube with a feeding pipe for distilled water. Above cupel 9 is arranged an electrode formed of a platinum ring 16 carried by an arm 17 adjustably secured to a rod 18 which passes through the base plate 1 and carries connecting nuts 19. A toric tube 20 provided with a plurality of holes 21, may be connected by an inlet tube 22 to a source of gas under pressure.

The whole unit thus formed is placed in a compartment of a box 23 with hinged lid 24 and side flap 25. In another compartment of said box is arranged a Ruhmkorff induction coil 26 of which the outlet terminals are respectively connected to terminals 14 and 19 and the inlet terminals to a rectifier and filter unit 27 of known type adapted to be fed by the power source through a transformer 28. The electrical connections in Fig. 2 have not been shown in order to avoid confusion in the drawings, but they may be easily understood.

The solution from which it is desired to obtain an aerosol is placed in cupel 9 and transformer 28 is connected to a power source. Under the high voltage provided by coil 26, sparks jump between electrode 16 and the surface of the solution in cupel 9, said solution being in contact with the terminal of coil 26 through rod 11, blade 12, wire 13 and terminal 14. These sparks rip off from the surface of the solution extremely fine particles of liquid, which remain in suspension in the atmosphere in bell-jar 2, thus forming the aerosol. Simultaneously, air or a neutral gas is forced through pipe 20 and drives off the aerosol through outlet 4. The distilled water arriving in cup 7 through pipe 6 passes through the porous cupel 9 and thus maintains the concentration of the solution.

The device as shown in Fig. 2 is light and easily transported. It is well adapted for use by practicians and in hospitals.

The high voltage produced by the coil may be of the order of 25,000 volts without any danger, owing to the fact that the current intensity is very low.

In the device shown at Fig. 3, the two electrodes are formed by a liquid. Said device comprises a glass container 30 with inlet and outlet openings 31 and 32. The open ends of two tubes 33 and 34 penetrate inside said container through stoppers 35 and 36 engaged in lateral openings provided in said container. The two tubes 33 and 34 are flared out at their opposed ends, thus forming respectively funnels 37 and 38 closed by stoppers 39 and 40. Conductors 41 and 42 and pipes 43 and 44 provided with cocks 45 and 46 pass respectively through stoppers 39 and 40, said conductors being connected for instance to the terminals of an induction coil.

When the device is to be operated, the liquid of which an aerosol is to be obtained is placed in the funnels 37 and 38 while closing the open ends of tubes 33 and 34, whereafter the stoppers 39 and 40 are adjusted, the cocks 45 and 46 of pipes 43 and 44 being shut. Tubes 33 and 34 are engaged in container 30 and the current is then caused to pass through the feeding coil. Sparks jump between the ends of tubes 33 and 34 out of which the liquid contained in funnels 37 and 38 flows in proportion with the opening of cocks 45 and 46.

Contrary to what is obtained with the atomizing device hitherto used, the method and device according to my invention makes it possible to obtain extremely fine liquid particles which deposit only very slowly. Such a suspension forms a true aerosol which behaves like a gas. It is thus possible to treat in a very efficacious manner affections of the lungs, sinus and other internal organis, using substances such as penicillin, streptomycin, sulfamides, radioactive substances, serums etc.

Other possible application are the atomizing of liquid insecticide substances and the production of aerosols of radioactive indicators which make it possible to follow their circulation in living organism and to obtain eventually photographs of the paths of such substances.

According to a further particular, my invention consists in using a porous material as a support for the liquid of which it is desired to produce an aerosol, the said porous material soaked with said liquid forming at least one of the electrodes between which the sparks are caused to jump.

An apparatus comprising such a porous electrode is shown in Fig. 4. Said apparatus comprises a tubular support 50 made of plastic material, closed by a transversal plate 51, and on which a tube 52 is removably secured by means of a sleeve 53 which presses on a spring 54 resting on a collar 55 of support 50 and is held onto tube 52 by a bayonet clamping. Tube 52 carries a hollow handle 56 and is surmounted with an inhalator 57.

On plate 51 is axially secured a socket 58 (Figs. 5 and 6) in which is slidably arranged a support 59 maintained by nuts 60 against the action of a spring 61 and terminating as a cup 62. Said cup carries a cupel 63, for instance made of glass, which is held in place by a metal cap 64 (Fig. 7) pressing down cupel 63 and support 59 and secured onto the latter by means of a bayonet clamp 65 shown in Fig. 7 cooperating with studs 66 and 67, the latter extending downwards through plate 51 in the shape of a contact socket 68. Cap 64 is provided with an axial tube 69 in which is placed a small rod 70 having a head 71 (Fig. 8) and made of a porous material, for instance porous porcelain or sintered glass, said rod being adapted to plunger practically down to the bottom of cupel 63. A non-metallic cap 64a could also be used (Fig. 9) but, in this case, a conducting ring 72 should be arranged on top of said cap so that the head 71 of rod 70 may rest on said ring, which should be connected by a wire 73 to the contact socket 68 or other similar contact member.

A rod 74 is removably secured and extends radially in tube 52, and carries at its inner end a flattened platinum plate 75 arranged on edge parallel to the upper surface of the head 71 of rod 70, at a distance of said head of about one millimeter.

A voltage amplifying transformer 76 is arranged inside the handle 56 and is connected, on the higher voltage side, to the outer end of rod 74 and, on the lower voltage side, to a high frequency source 77 of known type. A single wire is thus necessary for connecting the oscillator to the handle 56 of the apparatus, the rod 70 being grounded, through cap 64, stud 67, socket 68 and a wire 78.

A press–button 79 controls the passage of the current through the transformer 76.

The liquid of which it is desired to form an aerosol is placed in cupel 63 and the cap 64 is fitted. Said liquid soaks rod 70 and rises in head 71 of said rod. When the oscillator 77 is set into action and the press-button 79 is depressed, high voltage sparks jump between the electrode 75 and the liquid soaking the head of rod 70, causing, as in the preceding case, the formation of an aerosol of the liquid.

With this disposition, the said aerosol springs substantially perpendicularly to the upper surface of head 71 and is driven upwardly. Thus, a carrying off of the aerosol by means of a current of gas may be dispensed with This is particularly advantageous when using areosols for the post-operating treatment of the eyes, where the draft and pressure caused by the said current of gas would be injurious.

Of course, it is necessary that the liquid used as an electrode should be a conductor of electricity, but it does not imply that the substances of which it is desired to obtain an aerosol according to the invention should necessarily be electrolytes: in case said substances are not or are bad conductors of electricity a suitable electrolyte, such as sodium chloride, may be dissolved therein, in order to confer upon them electrically conducting properties.

I claim:

1. A device for producing aerosols by means of electric discharges between an electrically conducting liquid acting as an electrode and another electrode, comprising, a base structure, a cup adapted to contain said conducting liquid, a porous member arranged in said cup and extending out of and above said cup and saturable by said liquid, said second mentioned electrode being disposed adjacent that portion of said porous member which extends above said cup, an enclosure extending from said base structure and enclosing said porous member and said second mentioned electrode for confining the aerosols produced by said discharges and having an outlet at the top thereof, means for fitting said cup onto said base structure, and means for applying a high voltage current to said conducting liquid, when in said cup, and to the said second mentioned electrode, in order to generate an electric discharge between said liquid saturating said porous member and said second mentioned electrode.

2. A device for producing aerosols by means of electric discharges between an electrically conducting liquid acting as an electrode and another electrode, comprising a base structure, a cup adapted to contain said conducting liquid, said conducting liquid carrying the product to be aerosolized, a porous member arranged in said cup and extending out of and above said cup and saturable by said liquid, said second mentioned electrode being disposed adjacent that portion of said porous member which extends above said cup, an enclosure extending from said base structure and enclosing said porous member and said second mentioned electrode for confining the aerosols produced by said discharges and having an outlet at the top thereof, means for fitting said cup onto said base structure, and means for applying a high voltage current to said conducting liquid, when in said cup, and to the said second mentioned electrode, in order to generate an electric discharge between said liquid saturating said porous member and said second mentioned electrode.

3. A device for producing aerosols by means of electric discharges between an electrically conducting liquid acting as an electrode and another electrode, comprising a hollow cylindrical member made of insulating material, a platform arranged at the upper section of said hollow cylindrical member, a cup adapted to contain said conducting liquid, a porous member arranged in said cup and extending out of and above said cup and saturable by said liquid, said second mentioned electrode being disposed adjacent that portion of said porous member which extends above said cup, an enclosure extending from said platform and enclosing said porous member and said second mentioned electrode for confining the aerosols produced by said discharges and having an outlet at the top thereof, means for fitting said cup onto said platform arranged at the upper section of said hollow cylindrical member, and means for applying a high voltage current to said conducting liquid, when in said cup, and to the said second mentioned electrode, in order to generate an electric discharge between said liquid saturating said porous member and said second mentioned electrode.

4. A device for producing aerosols by means of electric discharges between an electrically conducting liquid acting as an electrode and another electrode, comprising a hollow cylindrical member made of insulating material, a platform arranged at the upper section of said hollow cylindrical member, a cup adapted to contain said conducting liquid, a rod running through said platform and supporting said cup, a porous member arranged in said cup and extending out of and above said cup and saturable by said liquid, said second mentioned electrode being disposed adjacent that portion of said porous member which extends above said cup, an enclosure extending from said platform and enclosing said porous member and said second mentioned electrode for confining the aerosols produced by said discharges and having an outlet at the top thereof, means to adjust the length of said rod carrying said cup above said platform, and means for applying a high voltage current to said conducting liquid, when in said cup, and to the said second mentioned electrode in order to generate an electric discharge between said liquid saturating said porous member and said second mentioned electrode.

5. A device for producing aerosols by means of electric discharges between an electrically conducting liquid acting as an electrode and another electrode, comprising a base structure, a cup adapted to contain said conducting liquid, a porous member comprising a rod topped by a head, said rod extending into said cup and said head extending out of and above said cup, whereby said porous member is maintained in a fixed position, said rod being saturable by said liquid, said second mentioned electrode being disposed adjacent the head of said porous member, an enclosure extending from said base structure and enclosing said porous member and said second mentioned electrode for confining the aerosols produced by said discharges, and having an outlet at the top of said enclosure, means for fitting said cup onto said base structure, and means for applying a high voltage current to said conducting liquid, when in said cup, and to the said second mentioned electrode, in order to generate an electric discharge between said liquid saturating said porous member and said second mentioned electrode.

6. A device for producing aerosols by means of electric discharges between an electrically conducting liquid acting as an electrode and another electrode, comprising a hollow cylindrical member made of insulating material, a platform arranged at the upper section of said hollow cylindrical member, a cup adapted to contain said conducting liquid, a porous member comprising a rod topped by a head, said rod extending into said cup and said head extending out of and above said cup whereby said porous member is maintained in a vertical position, said rod being saturable by said liquid, said second mentioned electrode being disposed adjacent the head of said porous member, an enclosure extending from said platform and enclosing said porous member and said second mentioned electrode for confining the aerosols produced by said discharges and having an outlet at the top thereof, means for fitting said cup onto said platform, a cylindrical removable cap resting on the peripheral edge of said cup, means for resiliently latching said removable cap with respect to said platform for confining said cup in position, an inner tube in the center of said removable cap adapted to receive the rod of said porous member and means for applying a high voltage current to said conducting liquid, when in said cup, and to the said second mentioned electrode, in order to generate an electric discharge between said liquid saturating said porous member and said second mentioned electrode.

7. A device for producing aerosols by means of electric discharges between an electrically conducting liquid acting as an electrode and another electrode, comprising a hollow cylindrical member made of insulating material, a platform arranged at the upper section of said hollow cylindrical member, a cup adapted to contain said conducting liquid a porous member comprising a rod topped by a head, said rod extending into said cup and said head extending out and above said cup wherby said porous member is maintained in a vertical position, said rod being saturable by said liquid, said second mentioned electrode being disposed adjacent said head of said porous member, an enclosure extending from said platform and enclosing said porous member and said second mentioned electrode for confining the areosols produced by said discharges and having an outlet at the top thereof, means for fitting said cup onto said platform arranged at the upper section of said hollow cylindrical member, a cylindrical removable cap resting on said cup, an inner tube in the center of said removable cap adapted to receive the rod of said porous member, the top of said cap having an opening therein for renewing said conducting liquid and means for applying a high voltage current to said conducting liquids, when in said cup, and to the said second mentioned electrode, in order to generate an eelctric discharge between said liquid saturating said porous member and said second mentioned electrode.

PIERRE MARIE RENÉ BARRET.

References Cited in the file of this patent

UNITED STATES PATENTS

| Number | Name | Date |
| --- | --- | --- |
| 398,327 | De Vars | Feb. 19, 1889 |
| 878,710 | Campbell et al. | Feb. 11, 1908 |
| 1,958,406 | Darrah | May 15, 1934 |
| 2,127,026 | Grindrod | Aug. 16, 1938 |
| 2,143,099 | Wynn | Jan. 10, 1939 |
| 2,302,185 | Campbell | Nov. 17, 1942 |
| 2,302,289 | Bramston | Nov. 17, 1942 |